(12) United States Patent
Hawthorn et al.

(10) Patent No.: US 8,782,796 B2
(45) Date of Patent: Jul. 15, 2014

(54) DATA EXFILTRATION ATTACK SIMULATION TECHNOLOGY

(75) Inventors: Trevor Tyler Hawthorn, Ashburn, VA (US); Nathan Miller, Haymarket, VA (US); Jeffrey LoSapio, Herndon, VA (US)

(73) Assignee: Stratum Security, Inc., Herndon, VA (US)

( * ) Notice: Subject to any disclaimer, the term of this patent is extended or adjusted under 35 U.S.C. 154(b) by 0 days.

(21) Appl. No.: 13/530,784

(22) Filed: Jun. 22, 2012

(65) Prior Publication Data
US 2013/0347085 A1 Dec. 26, 2013

(51) Int. Cl.
G06F 12/14 (2006.01)
(52) U.S. Cl.
USPC .................................. 726/25; 726/6
(58) Field of Classification Search
CPC ....................................... G06F 15/16
USPC ....................................... 726/5, 25
See application file for complete search history.

(56) References Cited

U.S. PATENT DOCUMENTS

| | | | |
|---|---|---|---|
| 8,272,061 B1 * | 9/2012 | Lotem et al. ............ | 726/25 |
| 8,474,037 B2 * | 6/2013 | Weiss et al. ............ | 726/22 |
| 2004/0221176 A1 * | 11/2004 | Cole .................. | 713/201 |
| 2005/0160480 A1 * | 7/2005 | Birt et al. ............... | 726/25 |
| 2007/0143851 A1 * | 6/2007 | Nicodemus et al. ....... | 726/25 |
| 2011/0047627 A1 | 2/2011 | Sheymov | |
| 2012/0084866 A1 * | 4/2012 | Stolfo ................. | 726/25 |
| 2012/0210433 A1 * | 8/2012 | Kovar et al. ........... | 726/25 |
| 2012/0255022 A1 * | 10/2012 | Ocepek et al. ........ | 726/25 |
| 2013/0276122 A1 * | 10/2013 | Sowder ............... | 726/24 |

OTHER PUBLICATIONS

Liu, Yali, Cherita Corbett, Ken Chiang, Rennie Archibald, Biswanath Mukherjee, and Dipak Ghosal. "SIDD: A framework for detecting sensitive data exfiltration by an insider attack." In System Sciences, 2009. HICSS'09. 42nd Hawaii International Conference on, pp. 1-10. IEEE, 2009.*
Kovar et al., Inventors, "Exfiltration testing & extrusion assessment system: information leak testing", U.S. Appl. No. 61/462,963, Filed on Feb. 10, 2011.

\* cited by examiner

*Primary Examiner* — Jeffrey Pwu
*Assistant Examiner* — Carlos Amorin
(74) *Attorney, Agent, or Firm* — Fleit Gibbons Gutman Bongini & Bianco PL; Jon A. Gibbons (57) ABSTRACT

Novel systems and methods for testing network security are disclosed. In one example, at least one specified data message and at least one specified access credential to at least one third-party web-based service is stored on a monitoring system. At least one software agent configured with the specified data message and the specified access credential to the third-party web-based service is installed on at least on system to be tested. The software agent is executed on the testing system to send the specified data message to the third-party web-based service using the specified access credential. A monitoring system which is independent of the network, access the third-party web-based service with the access credential. The monitoring system compares, if data on the third-party web-based service is equivalent to the specified data message sent by the software agent. In another example, the software agent is configured with a custom start-logging command.

20 Claims, 8 Drawing Sheets

FIG. 1

| <i> THREATSIM | INFILTRATION | EXFILTRATION | ADMIN | EMAIL@EMAIL.COM | LOG OUT |

EXFILTRATION >> AGENTS >> NEW AGENT
CREATE AN EXFILTRATION AGENT

AGENT NAME
[POST FIREWALL CHANGE TEST] ~202

DEPLOYMENT SITE
[WASHINGTON, DC] ~204

DEPLOYMENT NETWORK
[WEB DMZ] ~206

GATEWAY IP
[192.168.00.000] ~208

SIMULATE SENSITIVE DATA ~210
☑ CARD HOLDER DATA ~212
☑ PERSONAL HEALTH INFORMATION ~214
☑ PERSONALLY IDENTIFIABLE INFORMATION ~216
☑ SOCIAL SECURITY NUMBER ~218

CUSTOM EXFILTRATION VALUES  220

DESCRIPTION              CUSTOM DATA
[TOP SECRET]             [TOP SECRET]              ⊖ DELETE
     222                      224

⊖ ADD CUSTOM VALUE ~226
[CREATE] ~228

```
C:\Users\trevor\Desktop\xfil.exe                                    — ☐ ✕

GUID: eb895b
Session ID: 1330244542
Session Start Time (utc): 2012-02-26 03:22:22.596000
Source IP: 96.255.235.111
Wrote to pii to file: pii.txt
Wrote to phi to file: phi.txt
Wrote to ssn to file: ssn.txt
Wrote to chd to file: chd.txt
Wrote to u01 to file: u01.txt
Wrote to u01_ec to file: u01_ec.txt
Wrote to chd_ec to file: chd_ec.txt
Wrote to ssn_ec to file: ssn_ec.txt
Wrote to phi_ec to file: phi_ec.txt
Wrote to pii_ec to file: pii_ec.txt
Created random file eb895b_1330244542_1.tsf with file size 5 MB.
Created random file eb895b_1330244542_2.tsf with file size 5 MB.
Created random file eb895b_1330244542_3.tsf with file size 5 MB.
Created random file eb895b_1330244542_4.tsf with file size 5 MB.
Created random file eb895b_1330244542_5.tsf with file size 5 MB.
Created random file eb895b_1330244542_6.tsf with file size 5 MB.
Created random file eb895b_1330244542_7.tsf with file size 5 MB.
Created random file eb895b_1330244542_8.tsf with file size 5 MB.
Created random file eb895b_1330244542_9.tsf with file size 5 MB.
Created random file eb895b_1330244542_10.tsf with file size 5 MB.
Created random file eb895b_1330244542_11.tsf with file size 5 MB.
Created random file eb895b_1330244542_12.tsf with file size 5 MB.
Created random file eb895b_1330244542_13.tsf with file size 5 MB.
Created random file eb895b_1330244542_14.tsf with file size 5 MB.
Created random file eb895b_1330244542_15.tsf with file size 5 MB.
Created random file eb895b_1330244542_16.tsf with file size 5 MB.
Created random file eb895b_1330244542_17.tsf with file size 5 MB.
Created random file eb895b_1330244542_18.tsf with file size 5 MB.
Created random file eb895b_1330244542_19.tsf with file size 5 MB.
Created random file eb895b_1330244542_20.tsf with file size 5 MB.
Sent pii pt via http GET request.
Sent phi pt via http GET request.
Sent ssn pt via http GET request.
Sent chd pt via http GET request.
Sent u01 pt via http GET request.
Sent u01_ec ec via http GET request.
Sent chd_ec ec via http GET request.
Sent ssn_ec ec via http GET request.
Sent phi_ec ec via http GET request.
Sent pii_ec ec via http GET request.
http.rar successfully downloaded via http.
Posted results via HTTP.
http.exe successfully downloaded via http.
Posted results via HTTP.
http.zip successfully downloaded via http.
```

FIG. 4

| EXFILTRATION >> TEST RESULTS >> "ENGINEERING >> DETAILS |
|---|
| AGENT TESTED SITE COPPERMINE 1 MONTH AGO FROM ENGINEERING SEGMENT |
| (DOWNLOAD)  (COPY) |

| AGENT | SITE | NETWORK |
|---|---|---|
| ENGINEERING | COPPERMINE | ENGINEERING SEGMENT |

TEST RESULTS

SENSITIVE DATA

| | dns | ftp | ftps | http | https | smtp | tls | dropbox |
|---|---|---|---|---|---|---|---|---|
| CARD HOLDER DATA AS ENCRYPTED DATA — 5/10/2012 4:27:00 PM | N/A | ✓ | N/A | ✓ | ✓ | ✓ | ✓ | N/A |
| CARD HOLDER DATA AS PLAIN TEXT — 5/10/2012 4:27:00 PM | ✓ | ✓ | N/A | ✓ | ✓ | ✓ | ✓ | N/A |
| PERSONAL HEALTH INFORMATION AS ENCRYPTED DATA — 5/10/2012 4:27:00 PM | N/A | ✓ | N/A | ✓ | ✓ | ✓ | ✓ | N/A |
| PERSONAL HEALTH INFORMATION AS PLAIN TEXT — 5/10/2012 4:27:00 PM | ✓ | ✓ | N/A | ✓ | ✓ | ✓ | ✓ | N/A |
| PERSONALLY IDENTIFIABLE INFORMATION AS ENCRYPTED DATA — 5/10/2012 4:27:00 PM | N/A | ✓ | N/A | ✓ | ✓ | ✓ | ✓ | N/A |
| PERSONALLY IDENTIFIABLE INFORMATION AS PLAIN TEXT — 5/10/2012 4:27:00 PM | ✓ | ✓ | N/A | ✓ | ✓ | ✓ | ✓ | N/A |
| SOCIAL SECURITY NUMBER AS ENCRYPTED DATA — 5/10/2012 4:27:00 PM | N/A | ✓ | N/A | ✓ | ✓ | ✓ | ✓ | N/A |
| SOCIAL SECURITY NUMBER AS PLAIN TEXT — 5/10/2012 4:27:00 PM | ✓ | ✓ | N/A | ✓ | ✓ | ✓ | ✓ | N/A |

UPLOADED FILE DATA

| | dns | ftp | ftps | http | https | smtp | tls | dropbox |
|---|---|---|---|---|---|---|---|---|
| CAB FILE — 5/10/2012 4:27:00 PM | N/A | ✓ | N/A | ✓ | ✓ | N/A | N/A | N/A |
| EXECUTABLE FILE — 5/10/2012 4:27:00 PM | N/A | ✓ | N/A | ✓ | ✓ | N/A | N/A | N/A |
| RAR FILE — 5/10/2012 4:27:00 PM | N/A | ✓ | N/A | ✓ | ✓ | N/A | N/A | N/A |
| TEXT FILE — 5/10/2012 4:27:00 PM | N/A | ✓ | N/A | ✓ | ✓ | N/A | N/A | N/A |
| ZIP FILE — 5/10/2012 4:27:00 PM | N/A | ✓ | N/A | ✓ | ✓ | N/A | N/A | N/A |

FIG. 5

| CATEGORY | METHOD | ACTION | FILE TYPE | ENCRYPTION | PORT | PROTOCOL | CAPTURE METHOD | PARAMETERS PASSED TO xfil_dns |
|---|---|---|---|---|---|---|---|---|
| DNS | N/A | LOOKUP | TXT | NO | 53 | UDP | xfil_dns HTTP to Portal | guid, session id, data_type, data |
| | N/A | LOOKUP | CHD | NO | 53 | UDP | xfil_dns HTTP to Portal | guid, session id, data_type, data |
| | N/A | LOOKUP | PHI | NO | 53 | UDP | xfil_dns HTTP to Portal | guid, session id, data_type, data |
| | N/A | LOOKUP | PII | NO | 53 | UDP | xfil_dns HTTP to Portal | guid, session id, data_type, data |
| | N/A | LOOKUP | SSN | NO | 53 | UDP | xfil_dns HTTP to Portal | guid, session id, data_type, data |
| 604 | N/A | LOOKUP | STRING | NO | 53 | UDP | xfil_dns HTTP to Portal | guid, session id, data_type, data |
| SERVICES | DROPBOX | PUT | TXT | NO | 443 | TCP | Xfil Poller HTTP to Portal | N/A |
| | DROPBOX | PUT | CHD | NO | 443 | TCP | Xfil Poller HTTP to Portal | N/A |
| | DROPBOX | PUT | PHI | NO | 443 | TCP | Xfil Poller HTTP to Portal | N/A |
| | DROPBOX | PUT | PII | NO | 443 | TCP | Xfil Poller HTTP to Portal | N/A |
| | DROPBOX | PUT | SSN | NO | 443 | TCP | Xfil Poller HTTP to Portal | N/A |
| 606 | DROPBOX | PUT | STRING | NO | 443 | TCP | Xfil Poller HTTP to Portal | N/A |

FIG. 6A

| CHAT | | MESSAGE | TXT | NO | 6667 | TCP | IRC logs HTTP to Portal | guid, session id, data_type, data |
|---|---|---|---|---|---|---|---|---|
| | IRC | MESSAGE | TXT | NO | 6667 | TCP | IRC logs HTTP to Portal | guid, session id, data_type, data |
| | AOL | MESSAGE | TXT | NO | 5190, 80 | TCP | Xfil Poller HTTP to Portal | guid, session id, data_type, data |
| 670 | YAHOO! | MESSAGE | TXT | NO | 80, 443, 5050 | TCP | Xfil Poller HTTP to Portal | guid, session id, data_type, data |
| 608 | MSN | MESSAGE | TXT | NO | 80, 443, 8063 | TCP | Xfil Poller HTTP to Portal | guid, session id, data_type, data |

DATA EXFILTRATION ATTACK SIMULATION TECHNOLOGY

FIELD OF THE INVENTION

The present invention generally relates to information security and more specifically to the identification of network vulnerabilities.

BACKGROUND OF THE INVENTION

Computers and computer networks are increasingly interconnected over private and public networks, exposing them to increased risk of attack. A specific type of attack called a data breach (or data exfiltration) is one that occurs when data is taken from within a computer network. Data exfiltration has been described by the free encyclopedia WIKIPEDIA, at online URL with search term "Computer Security", as an unauthorized release of data from within a computer system or network. Malicious actors or "hackers" employ various techniques to transmit or steal sensitive information (data exfiltration). This is done by either gaining unauthorized access to an organization's through the use of malicious software referred to as "malware". Malware is software (or script or other code) designed to compromise the security of the target device, gather sensitive information, or gain unauthorized access to computer systems and connected networks.

Current network security assessment frameworks and testing technology focus on assessing for technical vulnerabilities at the application, network, or host level that would allow a malicious attacker to gain access or control over an organization's IT assets from the perspective of an anonymous outsider, or malicious insider. Data breaches occur after unauthorized access is obtained and the attacker begins to steal data, this is commonly referred to as a "data breach". Organizations do not have an automated and repeatable method to test their networks and security controls for common methods of data exfiltration.

SUMMARY OF THE INVENTION

The present invention enables organizations to test preventative and detective security controls ability to detect or prevent data exfiltration attacks. Automated technology simulates common data exfiltration techniques using a client-server/agent-sensor server architecture. The testing is carried out by simulating techniques, indicators, and activities utilized by malicious actors to steal an organization's sensitive, valuable, or confidential data from their networks and systems. Using testing agents, the present invention mimics how "hackers" transmit or exfiltrate sensitive data from within an organization's networks. Techniques include but are not limited to tunneling data out of the network via a variety of common protocols such as HTTP, HTTPS, Instant Messaging, ICMP, VPN technologies, SSH, SMTP, DNS, non-standard ports, and a variety of other methods. Additionally, the testing agents can mimic the network traffic of known and unknown malicious software. The testing enables organization to identify any gaps in their current preventative and detective network and security technical controls that could allow an attacker to steal data from the organization.

In one example, a user downloads the automated exfiltration assessment tool (Xfil) Agent to his or her computer system. Xfil is designed to be run from user workstations or server environments (e.g. DMZ, server networks, data centers, etc.) each with their own unique egress security controls. Upon execution Xfil begins to methodically transmit simulated sensitive data from within the network to the Xfil sensor server. The sensor server detects the transmitted data as well as the method that was used to successfully exfiltrate the data. Each successful test (including data content and method) is then sent to the reporting server 164 where the Xfil user can see the results of the simulation in real time. For example, the user may see that the Xfil Agent was able to exfiltrate credit card numbers via email, HTTP and DNS. Subsequent Xfil simulations will have a unique identifier so that multiple Xfil tests results may be present within the reporting server where they can be analyzed for trends, differences, improvements, etc.

In another example, a system and method for testing network security is disclosed. A monitoring system is used to store specified data message and specified access credentials to one or more third-party web-based services. A software agent is configured with the specified data message and the specified access credential to the third-party web-based services is installed on at least on system to be tested. The software agent could be distributed over physical medium, such as CD or DVDs, or the software agent could be downloaded from the monitoring system. The software agent is executed on the testing system to send the specified data message to the third-party web-based service using the specified access credential. Examples of third-party web-based services include a storage service, a chat service, an email service and a social media service. The specified data message includes simulated card holder data, simulated personal health information data, simulated personally identifiable information data, simulated social security number data or a combination thereof. A monitoring system which is independent of the network, accesses the third-party web-based service with the access credential.

The monitoring system compares, if data on the third-party web-based service is equivalent to the specified data message sent by the software agent. In one example the monitoring system compares if any data on the third-party web-based service is equivalent to the data message sent by the software agent by computing a hash value of the specified data message and comparing the hash value to a hash value of the specified data message stored by the monitoring system. A positive result will be indicated if any data on the third-party web-based service is equivalent to the specified data message sent by the software agent.

The monitoring system may include a graphical user interface for setting up the specified access credentials and/or the specified data message.

In another example, the software agent is configured with an address of an access point to a first network with one or more systems, and a name of a server system on a second network, and a custom start-logging command. The software agent is installed on at least one of the systems in the first network. The server system receives a query for a directory service. Network traffic associated with the configured agent based on the query including the address of the access point to the first network and the custom start-logging command from the configured software agent is logged.

Other objects, features, and advantages of the present invention will become apparent from the following detailed description. It should be understood, however, that the detailed description and specific examples, while indicating various embodiments of the present invention, are given by way of illustration only and various modifications may naturally be performed without deviating from the present invention.

BRIEF DESCRIPTION OF THE DRAWINGS

FIG. 4 is a screen shot of a Xfil agent running on a client system;

FIG. 5 is an example report of simulation results;

DETAILED DESCRIPTION

Various embodiments of the present invention will be discussed in detail herein below with reference to the attached drawings.

The present invention provides an automated exfiltration assessment tool (Xfil) that simulates data exfiltration techniques using a client-server/agent-sensor server architecture. This automated tool provides a significant advantage by automating the tedious and labor-intensive process of manually generating network traffic via the various methods and protocols utilized by malicious actors to steal data as well as setting up and configuring a sensor server. Additionally Xfil allows an organization to conduct regular, repeatable, and on-going assessments over time.

Operating Environment

Figure 1:
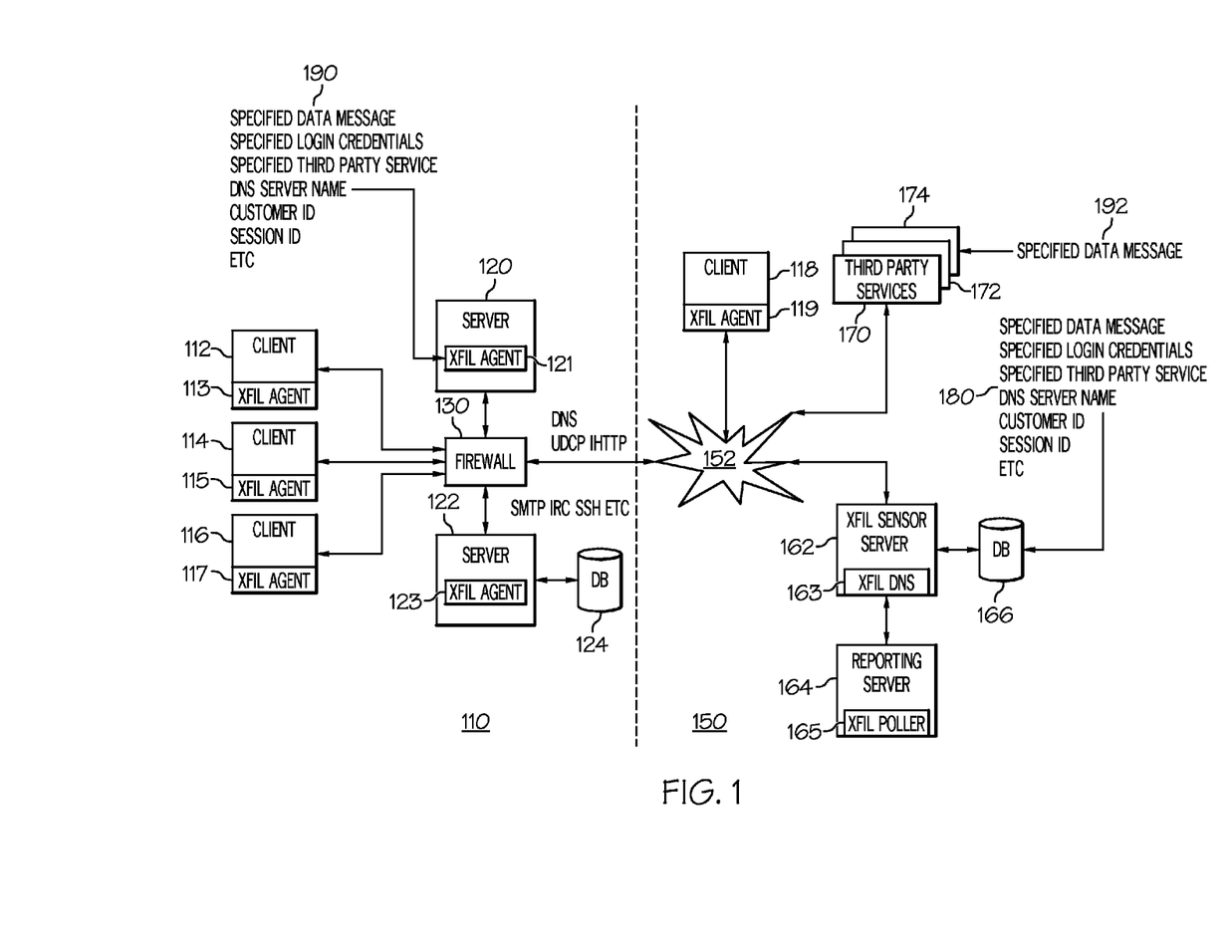
FIG. 1 is a functional block diagram illustrating an exemplary operating environment applicable to some embodiments of the present invention.

FIG. 1 shows an exemplary operating environment 100 applicable to some embodiments of the present invention for a data exfiltration assessment tool. This operating environment 100 can be a cloud computing environment, a non-cloud computing environment, or a combination of both. In this example, the environment is divided into two sides a private network side 110 on the left and a public network side 150 on the right. The private network side 110 is a company or organization's private network. The public network side 150 is a global communication infrastructure such as the Internet. The private network side 110 and public network side 150, in this example, comprises one or more types of networks, such as wide area networks, local area networks, and/or wireless networks. The networks support one or more protocols 152 including DNS, ICMP, HTTP, SMTP, IRC, and SSH.

One or more client systems 112, 114, 116 with agents 113, 115, 117 are communicatively coupled with local server 120 with agent 121 and local server 122 with agent 123 coupled to a database 124. The private network side 110 typically communicates via a firewall 130 to a public network 152 on the public side 150. The agents 113, 115, 117, 121, and 123 on each of the client system 112, 114, 116, and servers 120 and 122 is a software agent run by the customer that simulates an attacker by attempting to connect to and send sensitive data to the Xfil Sensor Server 162.

Coupled to the public network 152 is a client system 118 with an agent 119, an Xfil sensor server 162 and Xfil portal Server 164 (also known as ThreatSim server or monitoring system) for configuration and reporting. The client system 118 with agent 119 on the public side 150 could represent an employee accessing the private network side 110 of a company through virtual private networking or other secure remote access technologies. Xfil sensor server 162 is an internet-based sensor server that monitors inbound communication from the Xfil agents 113, 115, 117, 119, 121, and 123 on systems 112, 114, 116, 118, 120, and 122. The sensor server 162 then delivers the results of the simulation to the configuration and reporting web server 164, known as the portal server 164, where each user's configured agents 113, 115, 117, 119, 121, and 123 along with the xfiltration results are analyzed and stored. The ThreatSim server 164 is a web-based user portal where ThreatSim users can create new agents, or view the results of previous Xfil simulations, data successfully exfiltrated out of their network, etc. The Xfil sensor server 162 includes custom software, known as Xfil_dns 163 that listens as a DNS server on the and performs actions based on the commands sent via DNS lookups from Xfil agents 113, 115, 117, 119, 121, and 123.

Also shown are a plurality of third-party services 170, 172, 174. Examples of third party services are Drop-Box™, FaceBook®, webmail, such as Yahoo® or Gmail®, cloud storage providers such as Amazon®. In this example, a file or database 166 coupled to the Xfil sensor server 162. The database 166 includes a plurality of records 180 with information configured through a graphical user interface as described below with reference to FIG. 2. A part or all of these records 180 are used to configure parameters 190 of agents 113, 115, 117, 119, 121, and 123.

In the case where data exfiltration to the third-party web-based services 170-174 is being tested. Associated actions from the Xfil agent to the third-party services are governed by parameters 190. These parameters include a specific data message, sent to a specific web service using a specific login credential. As an example, the agent 121 may be communicating using a configured Yahoo® account. The specific data message is credit card data. Periodically, the Xfil profiler 165 using the same logon credentials to the Yahoo® account (the third-party web-based services 170-174) checks if the data message 192 matches the specific data message specified 180 by the Xfil Sensor server 162. A matching algorithm, such a hash algorithm on the data message 192 is compared with a hash value of the specified message 180.

The Xfil poller service 165 as part of the reporting server 174, authenticates to third party services of the user to determine if data from computer systems with agents 113, 115, 117, 119, 121, and 123 have been exfiltrated.

Although the Xfil server 162 and reporting server 164 are shown logically as two separate servers, in another example, the two server systems are integrated into one physical or logical system. This is possible through virtualized server technology on a common hardware platform.

The following is a detailed discussion on how the xfiltration simulation process works in operating environment 100.

Xfiltration Simulation

The data exfiltration assessment tool (Xfil) simulates the actions of a "bad actor" or other malicious agent within the inside of a computer data network. In one example, Xfil is run by the network administrator to test the network and associated systems ability to detect and/or prevent the increasingly sophisticated and more covert transmission of simulated sensitive data from the customer's networks to the Xfil Sensor Server 162. The four Xfil primary components illustrated in FIG. 1 are:

1) Xfil agents 113, 115, 117, 119, 121, and 123,
2) Xfil Sensor Server 162
3) Xfil DNS 163, and
4) Reporting Server (or monitoring system) 164.

Data exfiltration simulations provide organizations with visibility into the various methods that data can be transmitted from their private networks side 110 to a public network side 150 and enumerates the methods that are not prevented or detected by private network side 110 and security technologies including, but not limited to egress firewall rules, web proxy configurations, content filtering, data loss prevention (DLP), intrusion detection/prevention systems (IDS/IPS), and incident monitoring and detection.

Data exfiltration simulations can include fictitious sensitive information such as social security numbers (SSN), credit cardholder data (CHD), driver's license numbers (PII), patient health information (PHI), bank account numbers, or custom data types relevant to the organization, and malicious command and control (C2) network traffic.

Xfil Data Exfiltration Agent Creation

Figure 2:
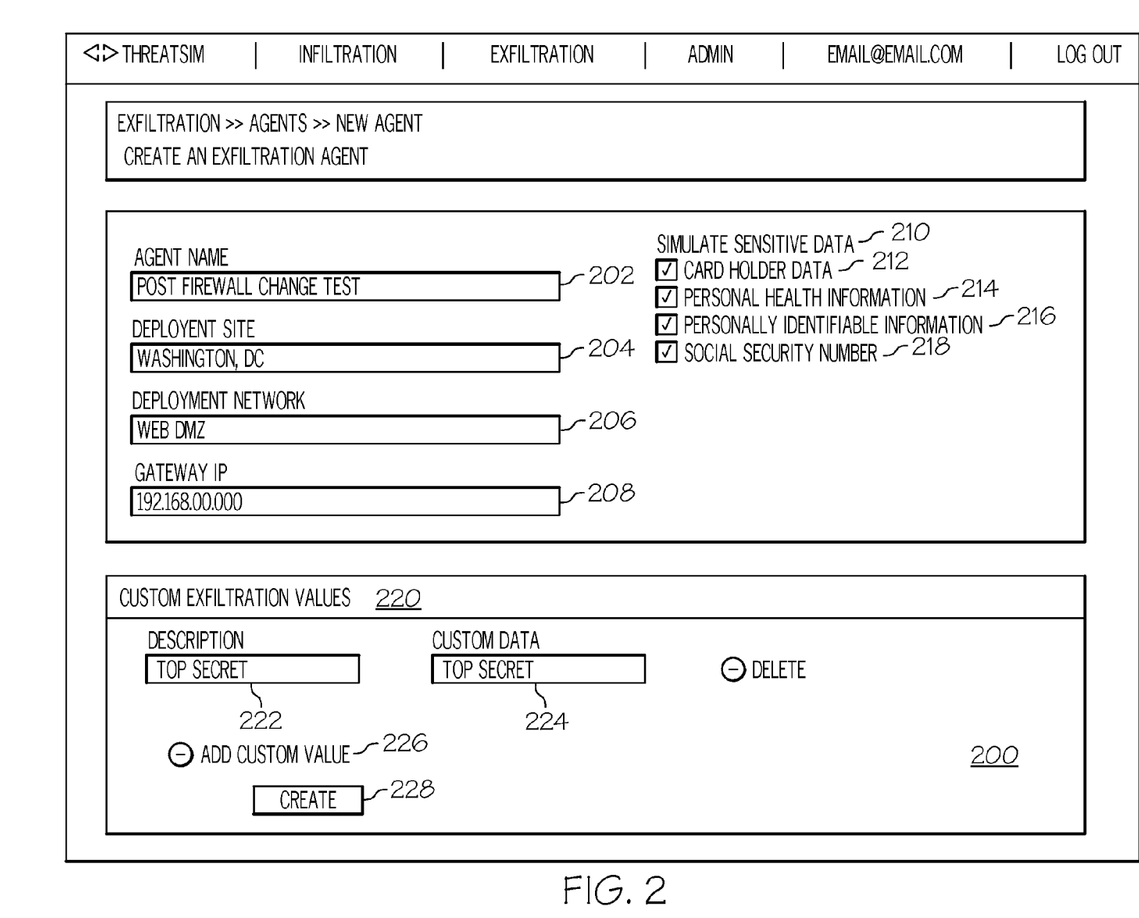
FIG. 2 is a screen shot of an automated exfiltration assessment tool (Xfil) agent page for creating a new agent.

Turning now to FIG. 2, shows an Xfil agent creation page. The user logs onto the reporting server 164 to configure an Xfil agent for a specific test. To create an Xfil agent, the field for agent name 202, a deployment site 204, a deployment network 206 and gateway IP 208 of firewall 130 is entered by a user as shown.

A section 210 allows users to define simulated sensitive data. In this example shown the agent is configured to include tests cases using simulated Card Holder Data 212, Personal Health Information 214, Personally Identifiable Information 216, and Social Security Number 218.

A section 220 allows the user to enter custom exfiltration values 220. Custom values could include additional simulated SSN (social security number), CHD (cardholder data), proprietary information, or names, that will be used during the assessment. Shown in this example, is a description 222 and custom data 224. A button 226 allows more custom data types to be added. The custom exfiltration values are created once create button 228 is selected by a user.

Next, a user downloads the Xfil agent 113-119 that was created to a system 112-122 on the private network side 110 with the associated with the entered gateway IP address 208.

A user runs the agent on one or more systems 112-118. The agent 113-119 automatically begins to send simulated sensitive data and IP packets that are transmitted to the Xfil Sensor Server 162 where they are recorded as successfully exfiltrated.

In another example, the Gateway IP 208 is determined by the agent automatically by querying local network configuration settings.

Overall Xfil Data Exfiltration Process Flow

Figure 3:
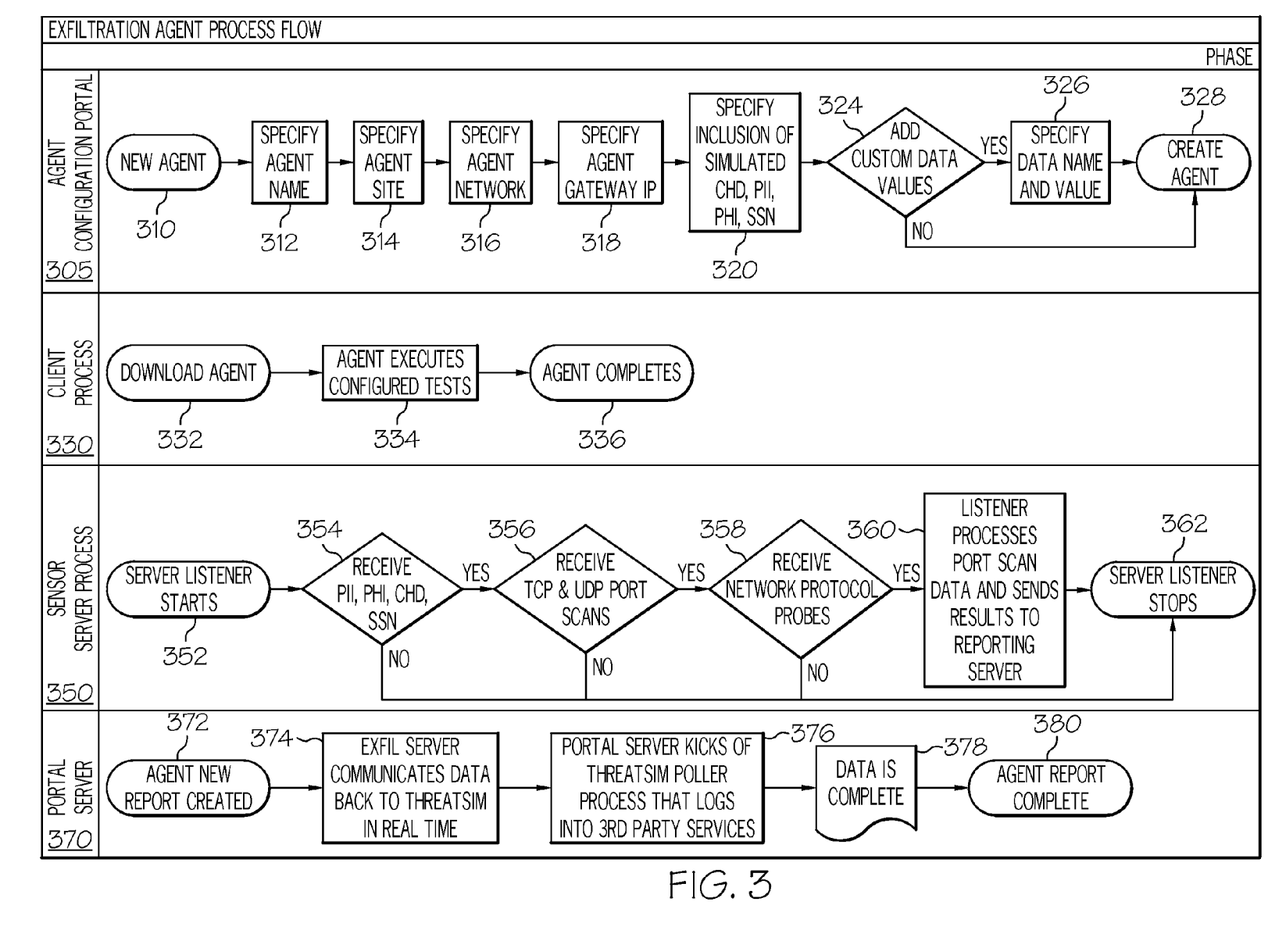
FIG. 3 is an overall flow of a Xfil process running in the operating environment of FIG. 1.

FIG. 3 is an overall flow of a Xfil process running in the operating environment of FIG. 1. Shown are the four separate processes running on the systems of FIG. 1 as follows:

1) Xfil Configuration Process 305—running on portal server 164;

2) Xfil Client Process 330—running on one or more client systems 112-118;

3) Xfil Sensor Server Process 350—running on Xfil sensor server 162; and 4) Portal Server Process 370—running on portal server 164.

Each of the above-referenced four processes will now be described. Starting with the Xfil Configuration Process 305 a new agent is created in step 310. This process corresponds to the entries in the fields 202-228 shown in the screen shot of FIG. 2 for creating a new Xfil agent. For convenience, these entries are denoted in parenthesis (2??), where ?? is a field in FIG. 2. To create an Xfil agent, the field for agent name is specified by a user in step 312 (202), a deployment site in step 314 (204), a deployment network in step 316 (207) and gateway IP 318 (208) of firewall 130.

Step 320 corresponds to section 210 in which the user specifies the types of sensitive data to be simulated e.g. Card Holder Data (CHD) 212, Personal Health Information (PHI) 214, Personally Identifiable Information (PII) 216, and Social Security Number (SSN) 218.

Step 324-328 corresponds to section 220 where the user enters custom exfiltration values 220. Examples of custom values include additional SSN, CHD, proprietary information, or one or more names, that will be used during the assessment. Shown in this example, is a description 222 and custom data 224. A button 226 allows more custom data to be added by looping back to step 324. The custom exfiltration values are created once create button 228 is selected by a user.

The Xfil client process 330 is now described. The previously created Xfil or software agent in process flow 305 is downloaded in step 332 to one or more of the client systems 112-118. In step 334 the agent executes the configured tests. An example of the agent test executing various tests is shown in the screen shot of FIG. 4. The various categories and methods of test are further described below in FIG. 7.

The Xfil sensor server process 350 running on sensor server 162 is now described. One or more client systems with agents 112-118, begin exfiltrating data using categories and methods previously configured in FIG. 2 and process 305. The sensor server begins to "listen" or receive data in step 352. Each category and method of data is identified. For example in step 354, the types of sensitive data selected in 210 e.g. CHD 212, PHI 214, PII 216, and SSN 218 are identified in step 354. Likewise TCP and UDP port scans are identified in step 356 and network protocol probes in step 358. The results and network traffic are logged in step 360 to portal server 164.

The Xfil portal server process 370 running on sensor server 164 is now described. A user through the portal selects for a report to be created in step 372. Data from the sensor server 162 is communicated back to the portal server 164 in real time in step 374. In step 376 the portal server logs into third-party services using Xfil poller 165. Examples of third-party services are Drop-Box™ FaceBook®, webmail, such as, Yahoo® or Gmail, cloud storage providers such as Amazon®. A test is made to see if data available at the third-party service is equivalent to the data specified by the Xfil system 162. The test completes in step 378 and report terminates in step 380.

An example report of the simulation results are shown in FIG. 5. These reports are viewable in the customer's ThreatSim portal account on reporting server 164.

Xfil Sensor Server DNS 163

In computing, a domain name server (DNS) is a computer server that hosts a network service for providing responses to queries against a directory service. It maps a human-recognizable identifier to a system-internal, often numeric, identification or addressing component. This service is performed by the server according to a network service protocol.

The inventors have discovered several challenges when trying to determine what data is allowed out of a highly secured network.

First, if the network is truly secure, it will be almost impossible for the computer system with agent 112-118 to communicate with the sensor server 162.

Second, during the port scan phase of the test, the computer system with agent 112-118 sends a single TCP/IP, ICMP, or UDP packet to the sensor server 162. It is impossible for the sensor server 162 to know which network traffic belongs to which customer and which customer network.

Xfil overcomes these challenges by using the domain name system (DNS) to send commands to the xfil_dns program running on the Xfil sensor server 162.

Using DNS to communicate to the Internet is possible in most cases because DNS is needed for almost all networked systems to operate. On a secure network 110, the firewall 130 may not allow individual computers to connect directly out to the Internet to send DNS requests to authoritative DNS servers. So the internal servers will send a request to the organization's caching DNS forwarding server, which is allowed to forward DNS requests to the Internet on behalf of internal clients.

Xfil uses this to its advantage by performing a DNS lookup for a specially-designed DNS name. To ensure that DNS requests are sent to the sensor server, the sensor server is set as the authoritative DNS server for the DNS zone dns.threatsim.com. The computer system with agent 112-118 requests a specially-designed DNS name containing information that the computer system with agent 112-118 uses to communicate with the sensor server 162. For example the DNS name:

ca56f2-1330045878-starttcp-173_66_108_152.dns.threatsim.com contains several pieces of information as shown:

| GUID | Session ID | Command | Source IP |
|------|------------|---------|-----------|
| ca56f2 | 1330045878 | starttcp | 173_66_108_152 |

The xfil_dns program running on the sensor server 162 parses the inbound DNS request and extracts the GUID, Session identifier (ID), command and the source IP of the computer system with Xfil agent 112-118 that is sending the IP traffic to the sensor server 162. This allows the sensor server 162 to distinguish that the traffic originating from 173.66.108.152 is associated with customer identifier (ID) ca56f2 (e.g. Acme, Inc.) and the specific session, 1330045878 (DMZ network scan).

Using this information, xfil_dns starts a process on the sensor server that captures all network traffic originating from the source IP sent in the DNS request (173.66.108.152) into a file on the sensor server 162. When the computer system with agent 112-118 has scanned all 65,535 TCP ports, it sends another DNS request to notify the sensor server that the TCP scan has completed (e.g. ca56f2-1330045878-stoptcp-173_66_108_152.dns.threatsim.com). The computer system with agent 112-118 then begins the UDP scanning phase and repeats the same steps described above.

Once the UDP scan is complete, the computer system with agent 112-118 sends a final DNS request:

ca56f2-1330045878-scancomplete-173_66_108_152.dns.threatsim.com

This notifies the sensor server 162 that the computer system with agent 112-118 has completed all scans. The xfil_dns program then parses the two network capture files (TCP/IP and ICMP and UDP) to determine the TCP/IP or ICMP or UDP ports that are allowed out of the customer's network. xfil_dns then sends the results to the portal web server via a web service call over HTTPS. The results of the Xfil test then appear in the portal server 164.

Xfil Poller Service Process 165

One of the features included with Xfil is the ability to exfiltrate data to third-party services such as social networks, cloud storage providers, webmail services, etc. In order for the reporting server to detect that a file or other data was successfully sent to a third-party service, the reporting server 164 runs the "ThreatSim Poller Service". The poller service is configured with the same credentials that the Xfil agent running on computer systems 112-118 is configured with when authenticating with the third-party services.

When the Xfil sensor server 162 receives the "scancomplete" command, as described above, the sensor server 162 sends a message to the portal server 164 via web services. This message tells the ThreatSim Poller service to poll each third-party service to retrieve any exfiltrated files. The files are then downloaded from the third-party services and examined to ensure that alterations were not made to the files. The examination includes an md5 checksum to ensure that the files have not been tampered with. If the files are found on the third-party services and found to be intact, the specific test (e.g. Social Network 1 Test) is marked positive in the reporting interface.

Technical Details of Xfil's Exfiltration Techniques:

Xfil uses a variety of techniques to exfiltrate data to the Xfil sensor server 162 as well as to the third-party services 170, 172, and 174. These techniques are organized into categories and methods. An example of some of categories and methods are shown with reference table in FIGS. 6A and 6B.

Figure 6A:
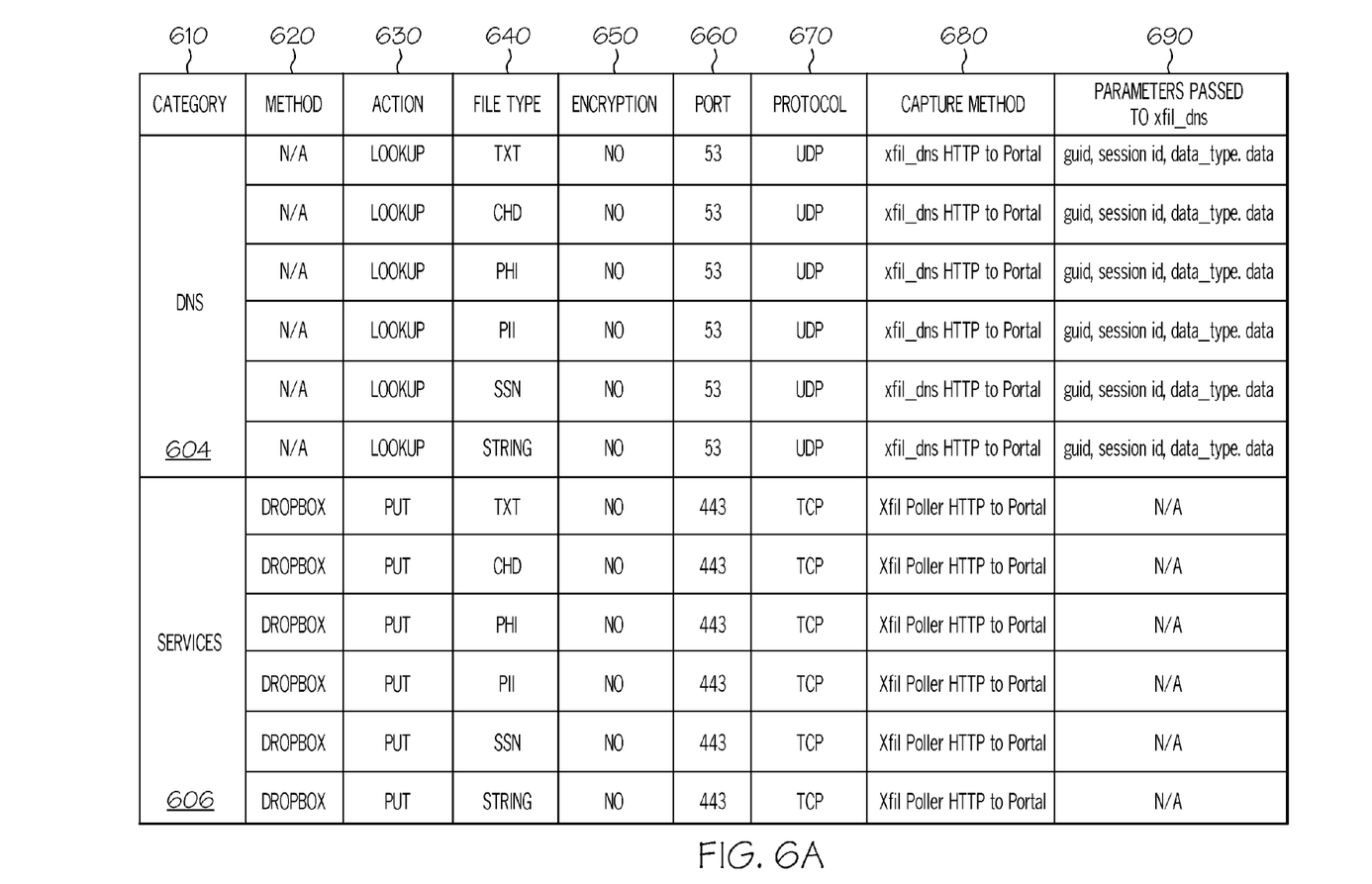
FIGS. 6A and 6B is a table of Xfil techniques organized into categories and methods.
Figure 6B:
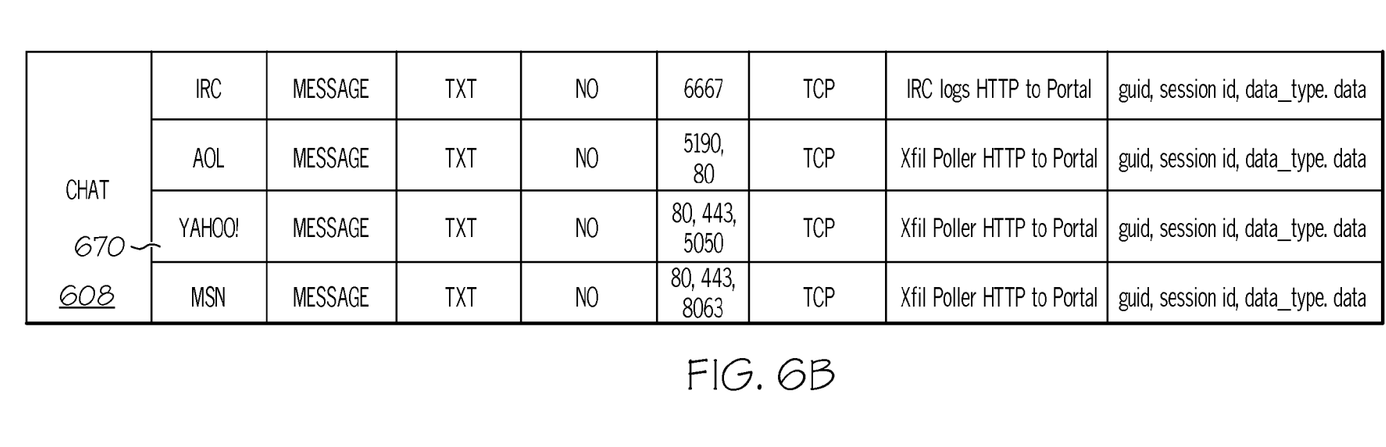

Turning to FIGS. 6A and 6B, shown is a small sampling of several different categories. The table is divided into columns categories 610, method 620, action 630, file type 640, encrypting 650, port 660, protocol 670, capture method 680, and parameters 690. Within each category 610 is a method 620 (or sub-category). Example categories are DNS 604, Services 606, and Chat 608. In the category of chat 608, there are methods IRC, AOL, Yahoo! , MSN. Referring to row 670 the Xfil agent will use Chat 608, Yahoo! Messenger within the Chat category to send a TXT file in file type 640, unencrypted 650 via ports 80, 443, or 5050 in ports 660 using TCP in protocol 670. In this example the customer would have a chat client setup to work with Xfil poller 165. For example the customer may have an MSN Messenger account. The Xfil Poller service 165 will then detect and record the results to the Reporting server 164.

Xfil Deployment

Xfil is currently implemented in a software-as-a-service (SaaS) model. The Xfil program is installed and managed by Stratum Security in the cloud infrastructure. Customers are granted access via reporting server 164 also known as the Stratum's ThreatSim portal. Xfil agents are configured and downloaded from the portal, and results of an attack simulation are recorded and viewable in the portal.

Managed Install Version—Xfil is designed as software that is installed and run from a computer. This deployment requires communication to the ThreatSim portal 164 to log each installed Xfil agent on system 112-118 in order to accurately record and track the results from an attack simulation. The individual software would not work without a "sensor server" located on the Internet to collect transmissions from the Xfil agent 113-119.

Vulnerability Scanner Functionality—Xfil functionality is included as functionality in a network security vulnerability scanner; this would increase the scanner's value by both identifying external network security vulnerabilities along with vulnerabilities associated with data exfiltration attacks.

Proliferation Analysis—Xfil is designed to analyze how malware can traverse an organization's network environment and infrastructure after installing itself on an initial device. Commonly referred to as "spidering"—this ability is key in understanding how a malware infection can lead to data breaches from various network locations.

Mobile Exfiltration Analysis—Xfil is designed to work on mobile phones and tablet devices to determine if malware can transmit sensitive data from these devices. Transmission methods will include 802.11 wireless, cellular, TCP/IP, SMS, Bluetooth, internal and removable storage, and Near Field Communications.

Data Targeting & Acquisition—Xfil includes functionality that simulates how malware and malicious actors target, acquire, and prepare data on an organization's system for unauthorized exfiltration to steal the data.

Network Enumeration—Xfil simulates how malicious attackers perform network enumeration within an organization's network to gain a better understanding of network architecture, security controls, and locations of valuable assets and confidential/sensitive information. Malicious attackers as part of their exfiltration attacks use this process.

Customer Premise Equipment (CPE) Install—The Xfil sensor server 162 is installed outside the customer's network 110 in order to detect exfiltration from inside the customer's network 110. This configuration will allow the customer complete physical control over the device located within the customer's data center, network, etc.

Continuous Data Stream—Xfil is designed to transmit a continuous stream of exfiltration data that will allow an organization to perform changes to their environment and view the impact the changes had on their susceptibility to data exfiltration in real time.

Cloud Instance—Xfil is used in a cloud environment to analyze how malware can traverse within a cloud environment including discovering and targeted networks and organizations connected to the cloud via VPN.

Third-Party Issued Agent—Xfil, and the associated software infrastructure, will be designed so that an organization that seeks to test the security of third-parties (such as vendors, business partners, or target acquisitions) can make Xfil available in a single one-time-use file download that reports back to the Xfil sensor server 162. The customer can then examine risks associated with the third-party's network infrastructure.

Peer-to-Peer—Xfil is designed so that two Xfil agents 113-119 can interact with one another. One configuration may include the ability for a "master" Xfil agent to operate as a controller of one or more distributed "worker" agents who gather information about the customer's network and environment, as well as transfer simulated data over the internal network, and report back to the master. The master agent will then package and exfiltrate the simulated data collected about the network back to the Xfil sensor server 162.

"Headless" Configuration—Xfil is designed so that the customer can manage several Xfil agents deployed within the customer's environment from a central console, either via the hosted SaaS solution or located on the customer's network. The headless Xfil agents 113-119 will be designed to run as a service or daemon on the remote machines, and continually check in at regular intervals with the controlling server for instructions.

In one example, a weighted risk factor is assigned to the computer or system being tested based on the type data being exfiltrated. For example, an organization may be particularly concerned with a specific type of information, such as any information labeled as "Top Secret" to a government contractor or credit card (CC) data or payment card industry (PCI) data for a business, or patient health information (PHI) data for health related facilities.

Non-Limiting Deployment Options

While the following is a detailed discussion on cloud computing, implementation of the present invention are not limited to a cloud computing environment. Rather, embodiments of the present invention are capable of being implemented in conjunction with any type of computing environment now known or later developed. For example, embodiments of the present invention are applicable to a computing environment with a virtualized infrastructure or any other type of computing environment.

For convenience, this Detailed Description includes the definitions below that have been derived from "Draft NIST Working Definition of Cloud Computing," by Peter Mell and Tim Grance, dated Oct. 7, 2009, which is herein incorporated by reference. However, cloud computing environments that are applicable to one or more embodiments of the present invention are not required to correspond to the definitions and characteristics given below or in the "Draft NIST Working Definition of Cloud Computing" publication. The following definitions, characteristics, and discussions of cloud computing are given only as non-limiting examples.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
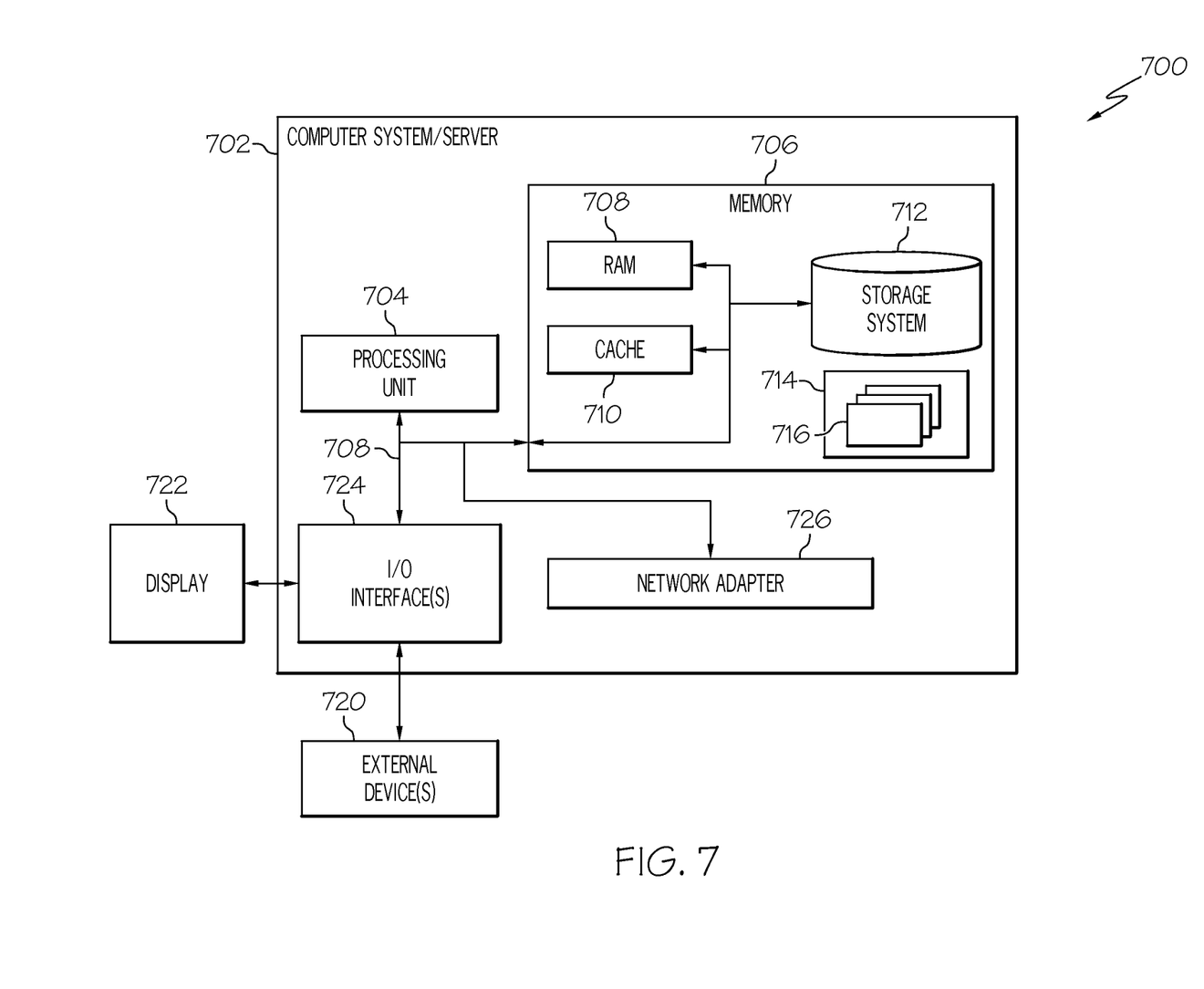
FIG. 7 is a schematic of an exemplary cloud computing node.

FIG. 7 shows a schematic of an exemplary cloud computing node. Cloud computing node 700 is only one example of a suitable cloud computing node and is not intended to suggest any limitation as to the scope of use or functionality of embodiments of the invention described herein. Regardless, cloud computing node 700 is capable of being implemented and/or performing any of the functionality set forth hereinabove.

In cloud computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, a computer system/server 702 (such as information processing system 70 in FIG. 1) in cloud computing node 700 is shown in the form of a general-purpose computing device. It should be noted that this system 702 is not required to reside within a cloud computing environment and can reside in a non-cloud computing environment as well. The components of computer system/server 702 may include, but are not limited to, one or more processors or processing units 704, a system memory 706, and a bus 708 that couples various system components including system memory 706 to processor 704.

Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706, in one embodiment, comprises the Xfil sensor 162, Xfil DNS 164, reporting server 164, and Xfil poller 165 and there components, as described above. These components can also be implemented in hardware as well. The system memory 706 can include computer system readable media in the form of volatile memory, such as random access memory (RAM) 77 and/or cache memory 712. Computer system/server 702 may further include other removable/non-removable, volatile/non-volatile computer system storage media. By way of example only, storage system 714 can be provided for reading from and writing to a non-transitory, non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of embodiments of the invention as described herein.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A computer-implemented method for testing network security, the method comprising:
   storing on a monitoring system at least one specified data message and a at least one specified access credential to at least one third-party web-based service;
   installing on at least one testing system to be tested on a network, at least one software agent configured with the at least one specified data message and the at least one specified access credential to the at least one third-party web-based service;
   executing the at least one software agent on the testing system to send the at least one specified data message to the at least one third-party web-based service using the at least one specified access credential;
   accessing, with a monitoring system which is independent of the network, the at least one third-party web-based service with the at least one specified access credential;
   comparing, with the monitoring system, if data on the at least one third-party web-based service is equivalent to the at least one specified data message sent by the at least one software agent; and
   assigning a risk factor to the testing system and the at least one third-party web-based service if any data on the at least one third-party web-based service is equivalent to the at least one specified data message sent by the at least one software agent.

2. The method of claim 1, further comprising:
   downloading from the monitoring system to the testing system the at least one software agent with the at least one specified data message and the at least one specified access credential to the at least one third-party web-based service.

3. The method of claim 1, wherein the at least one third-party web-based service is at least one of a storage service, a chat service, an email service, and a social media service.

4. The method of claim 1, wherein the at least one specified data message includes at least one of card holder data, personal health information data, personally identifiable information data, and social security number data.

5. The method of claim 1, wherein the at least one specified data message is selected by a user using a graphical user interface presented by the monitoring system.

6. The method of claim 1, further comprising:
   logging if any data on the at least one third-party web-based service is equivalent to the at least one specified data message sent by the at least one software agent.

7. The method of claim 1, wherein the comparing at the monitoring system if any data on the at least one third-party web-based service is equivalent to the data message sent by the at least one software agent includes computing a hash value of the at least one specified data message and comparing the hash value to a hash value of the at least one specified data message stored by the monitoring system.

8. A system for testing security of a network, the system comprising:
   a memory;
   a processor communicatively coupled to the memory for performing;
      storing on a monitoring system at least one specified data message and a at least one specified access credential to at least one third-party web-based service;
      installing on at least one testing system to be tested on a network, at least one software agent configured with the at least one specified data message and the at least one specified access credential to the at least one third-party web-based service;
      executing the at least one software agent on the testing system to send the at least one specified data message to the at least one third-party web-based service using the at least one specified access credential;
      accessing, with a monitoring system which is independent of the network, the at least one third-party web-based service with the at least one specified access credential;
      comparing, with the monitoring system, if data on the at least one third-party web-based service is equivalent to the at least one specified data message sent by the at least one software agent; and
      assigning a risk factor to the testing system and the at least one third-party web-based service if any data on the at least one third-party web-based service is equivalent to the at least one specified data message sent by the at least one software agent.

9. The system of claim 8, further comprising:
   downloading from the monitoring system to the testing system the at least one software agent with the at least one specified data message and the at least one specified access credential to the at least one third-party web-based service.

10. The system of claim 8, wherein the at least one third-party web-based service is at least one of a storage service, a chat service, an email service, and a social media service.

11. The system of claim 8, wherein the at least one specified data message includes at least one of card holder data, personal health information data, personally identifiable information data, and social security number data.

12. The system of claim 8, wherein the at least one specified data message is selected by a user using a graphical user interface presented by the monitoring system.

13. The system of claim 8, further comprising:
    logging if any data on the at least one third-party web-based service is equivalent to the at least one specified data message sent by the at least one software agent.

14. The system of claim 8, wherein the comparing at the monitoring system if any data on the at least one third-party web-based service is equivalent to the data message sent by the at least one software agent includes computing a hash value of the at least one specified data message and comparing the hash value to a hash value of the at least one specified data message stored by the monitoring system.

15. A non-transitory machine readable medium encoded with a program for testing security of a network, the program comprising instructions for:
- storing on a monitoring system at least one specified data message and a at least one specified access credential to at least one third-party web-based service;
- installing on at least one testing system to be tested on a network, at least one software agent configured with the at least one specified data message and the at least one specified access credential to the at least one third-party web-based service;
- executing the at least one software agent on the testing system to send the at least one specified data message to the at least one third-party web-based service using the at least one specified access credential;
- accessing, with a monitoring system which is independent of the network, the at least one third-party web-based service with the at least one specified access credential; and
- comparing, with the monitoring system, if data on the at least one third-party web-based service is equivalent to the at least one specified data message sent by the at least one software agent; and
- assigning a risk factor to the testing system and the at least one third-party web-based service if any data on the at least one third-party web-based service is equivalent to the at least one specified data message sent by the at least one software agent.

16. The non-transitory machine readable medium of claim 15, further comprising:
- downloading from the monitoring system to the testing system the at least one software agent with the at least one specified data message and the specified at least one access credential to the at least one third-party web-based service.

17. The non-transitory machine readable medium of claim 15, wherein the at least one third-party web-based service is at least one of a storage service, a chat service, an email service, and a social media service.

18. The non-transitory machine readable medium of claim 15, wherein the at least one specified data message includes at least one of card holder data, personal health information data, personally identifiable information data, and social security number data.

19. The non-transitory machine readable medium of claim 15, wherein the at least one specified data message is selected by a user using a graphical user interface presented by the monitoring system.

20. The non-transitory machine readable medium of claim 15, further comprising:
- logging if any data on the at least one third-party web-based service is equivalent to the at least one specified data message sent by the at least one software agent.

* * * * *